Patented May 21, 1935

2,001,788

UNITED STATES PATENT OFFICE 2,001,788

STABILIZATION OF ALDEHYDE PRODUCTS

Percy Joshua Leaper, Naugatuck, Conn., assignor, by mesne assignments, to United States Rubber Company, New York, N. Y., a corporation of New Jersey No Drawing. Application April 20, 1933, Serial No. 667,042

4 Claims. (Cl. 23—250)

This invention relates to the preservation and stabilization of certain aldehyde products and to the resulting stabilized compositions.

Among the difficulties attendant the manufacture and use of certain perfumery intermediates is the difficulty of suitably protecting them against the effects of oxygen during their manufacture and also during their subsequent storage and use. Of importance among such perfumery chemicals are certain unsaturated aromatic aldehydes and partially oxidized unsaturated aromatic aldehydes. Perfumery chemicals are now purchased, blended, and sold on the final criterion of smell or odor, rather than purity. The inventor has recognized that these differences in "shade" and "tone" are frequently due to the presence of partially oxidized chemicals. In some instances in the perfumery trade the presence of such partially oxidized materials is required along with the unoxidized chemicals, for the purpose of duplicating and matching the odor of perfume products, but unless the state of oxidation of the partially oxidized materials and the state of the unoxidized products is preserved, undesirable acid substances are formed by auto-oxidation, resulting in objectionable smell or rancidity which seriously interferes with the commercial value of the products. One of the aldehydes which is notorious for this misbehavior is amyl cinnamic aldehyde having the formula

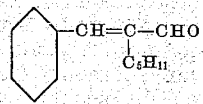

This material undergoes a complex auto-oxidation when subjected to the influence of oxygen, the end products probably being benzoic and n-caproic acids.

In the manufacture of amyl cinnamic aldehyde, the amyl cinnamic aldehyde is separated from associated materials by distillation processes such as vacuum distillation. This treatment causes some auto-oxidation of the aldehyde and formation of acid which reduces the yield of pure material and may also attack the equipment causing corrosion and undesirable or non-uniform odors. During the time interval between the preparation of the crude or impure aldehyde and the final purification step, there is also an opportunity for the aldehyde to become oxidized, dependent on the extent of the delays arising in the several steps of a commercial process. Auto-oxidation of the aldehyde continues even after the final distillation as indicated by progressive rise in acid content during storage and use. While a certain amount of auto-oxidation may be desirable in some cases uncontrolled auto-oxidation is not desirable.

An object of this invention is to provide a stabilized standardized amyl cinnamic aldehyde, and stabilized standardized mixtures of the same with oxidation products having the desired odor. The individual perfume manufacturer has become accustomed to the use of intermediates containing these oxidation products in amounts dependent on the particular method of preparation and equipment used. Consequently, it frequently happens that the perfume manufacturer rejects and refuses to accept a shipment of perfumery chemicals, which may contain higher or lower amounts of oxidation products than in previous shipments, solely on the basis of "sense of smell", even though the chemicals in question are of higher purity and quality. By "standardized" is meant the property of being predetermined and fixed with respect to desired components by the substantial prevention or retardation of oxidation in the aldehyde or the stabilization or preservation against oxygen of any mixture of the same as the case may be during and/or subsequent to preparation. A further object is to prepare a standardized amyl cinnamic aldehyde to which any desired concentration of partially oxidized amyl cinnamic aldehyde may be added to produce a blend which will be more suitable for perfumery compounding and which will retain its good qualities for a considerable time even though exposed to oxidizing conditions. Other objects will be apparent from the following description.

Example 1.—A stabilized amyl cinnamic aldehyde is produced by adding thereto a small proportion, for example ½% by weight, of diphenylamine. The effectiveness of the anti-oxygen is measured by exposing thin films of the mixtures in flat dishes under free circulation of air and measuring periodically the extent of free acidity developed, as determined in a small aliquot portion. The increase in acidity is a measure of the speed and extent of oxidation. The figures under "Change in acidity" in Table I show the milligrams of potassium hydroxide required to neutralize the acid formed in one gram sample during progressive oxidation. For purposes of comparison in each case a similar mix is placed in a container and sealed against exposure to air and kept so for corresponding lengths of time. The same procedures are carried out with a blank (identical with the exposed sample) containing no anti-oxygen, which is made up and subjected to the same conditions as those imposed upon the exposed mixture. The results are tabulated as follows:

TABLE I

|   | | Exposed for 170 hours | | | Exposed for 336 hours | | |
|---|---|---|---|---|---|---|---|
|   | | Acidity of sealed sample | Acidity of exposed sample | Change in acidity | Acidity of sealed sample | Acidity of exposed sample | Change in acidity |
| 1 | No antioxidant (Blank) | 1.45 | 102.7 | +101.25 | 1.15 | 128.2 | +127.0 |
| 2 | Diphenylamine | 1.04 | 1.03 | −0.01 | 0.95 | 1.38 | +0.43 |

The stabilization or preserving characteristics of diphenylamine seems to be specific to it and not attributable to the whole chemical class which it represents and it is difficult to predict its behavior merely from observation of its chemical structure. In addition, it is expedient to consider its physical characteristics in regard to odor, color, volatility, etc. and its specific effects on the final perfume blend.

Beneficial results are also obtained by adding the anti-oxygen during the processing of the amyl cinnamic aldehyde, that is adding same to the unpurified amyl cinnamic aldehyde prior to the final separation by vacuum distillation from associated materials formed or present during the process of manufacture.

It has also been found that when the anti-oxygen is added to a partially oxidized amyl cinnamic aldehyde either directly as such or indirectly in the form of a stabilized aldehyde that the same beneficial properties are obtained as when added to a pure unoxidized material. This statement may be verified by referring to Table II wherein diphenylamine is added, in turn, to various mixtures of pure stabilized amyl cinnamic aldehyde and well oxidized amyl cinnamic aldehyde. The term "well oxidized" as used in Table II is intended to refer to an unprotected amyl cinnamic aldehyde which has been exposed for a sufficient period of time in air until a marked increase in acidity has been noted. The rate of oxidation may be hastened by elevating the temperature or by increasing the air-surface interface of the amyl cinnamic aldehyde or by passing oxygen into the liquid aldehyde.

TABLE II

*Stabilization of blends of well oxidized amyl cinnamic aldehyde and pure aldehyde*

(Diphenylamine used as anti-oxygen)

| | Percentage of oxidized aldehyde used | Percentage of pure stabilized aldehyde used | Acidity determined after— | | |
|---|---|---|---|---|---|
| | | | Blending, prior to exposure | 168 hours of free exposure to air | 408 hours of free exposure to air |
| 1 | 0.5 | 99.5 | 1.0 | 1.0 | 1.1 |
| 2 | 1.0 | 99.0 | 1.6 | 1.2 | 1.3 |
| 3 | 1.5 | 98.5 | 1.7 | 1.6 | 1.7 |
| 4 | 2.0 | 98.0 | 2.3 | 1.8 | 2.0 |
| 5 | 3.0 | 97.0 | 2.8 | 2.2 | 2.6 |
| 6 | 4.0 | 96.0 | 3.4 | 2.8 | 3.3 |
| 7 | 5.0 | 95.0 | 4.4 | 3.7 | 3.9 |
| 8 | 7.5 | 92.5 | 5.8 | 5.6 | 5.6 |
| 9 | 10.0 | 90.0 | 7.9 | 7.3 | 7.2 |
| 10 | 15.0 | 85.0 | 11.7 | 10.7 | 10.7 |
| 11 | 20.0 | 80.0 | 15.7 | 14.6 | 14.6 |
| 12 | 25.0 | 75.0 | 19.7 | 18.0 | 18.1 |
| 13 | 100.0 | | 80.0 | 119.5 | 127.5 |
| 14 | | 100.0 | 1.1 | 0.6 | 0.8 |

It will be apparent from Table II that a substantially stable standardized blend of unoxidized and partially oxidized aldehyde may be developed to satisfy the requirements of the perfumery trade by the control process of this invention.

One-half of one percent (by weight) of the anti-oxygen is added to stabilize the pure amyl cinnamic aldehyde used in Table II and none in the oxidized aldehyde; it will be found that the proportion of anti-oxygen in the aldehyde to be stabilized may be varied from about 0.1% to 1% with similar beneficial results.

It will be obvious to those skilled in the art that the duration and effectiveness of the protection afforded the amyl cinnamic aldehyde by the anti-oxygen, when added prior to or during the vacuum distillation step, is dependent on the volatility of the anti-oxygen under these conditions, and, in certain instances, may remain behind in the still residue. In this event, it has been found desirable to add a small amount of the anti-oxygen to the aldehyde after distillation to stabilize same during storage and use. The invention discloses a practical method of stabilizing any amyl cinnamic aldehyde prepared according to present practice (and, hence, containing varying amounts of oxidation products) against further oxidation and change in odor during storage and use. Finally, the invention provides a convenient means of duplicating the desired odors of aldehyde products, which for the first time may be controlled by acid number determinations.

Having described the invention, it will be clear that various changes may be made in the application thereof without departing from the spirit and scope of the invention and it is not desired to limit the invention otherwise than as set forth in the appended claims.

Having thus described my invention, what I claim and desire to protect by Letters Patent is:

1. A process of improving the perfume characteristics of an amyl cinnamic aldehyde as commercially prepared which comprises adding thereto a small amount of diphenylamine.

2. A process of controlling the perfume tone of amyl cinnamic aldehyde which comprises adding to amyl cinnamic aldehyde a small amount of diphenylamine.

3. An amyl cinnamic aldehyde as commercially prepared associated with a small amount of diphenylamine.

4. Amyl cinnamic aldehyde associated with a small amount of diphenylamine.

PERCY JOSHUA LEAPER.